(No Model.)
J. H. RATHBUN.
TAPPING DEVICE.
No. 332,436.  Patented Dec. 15, 1885.
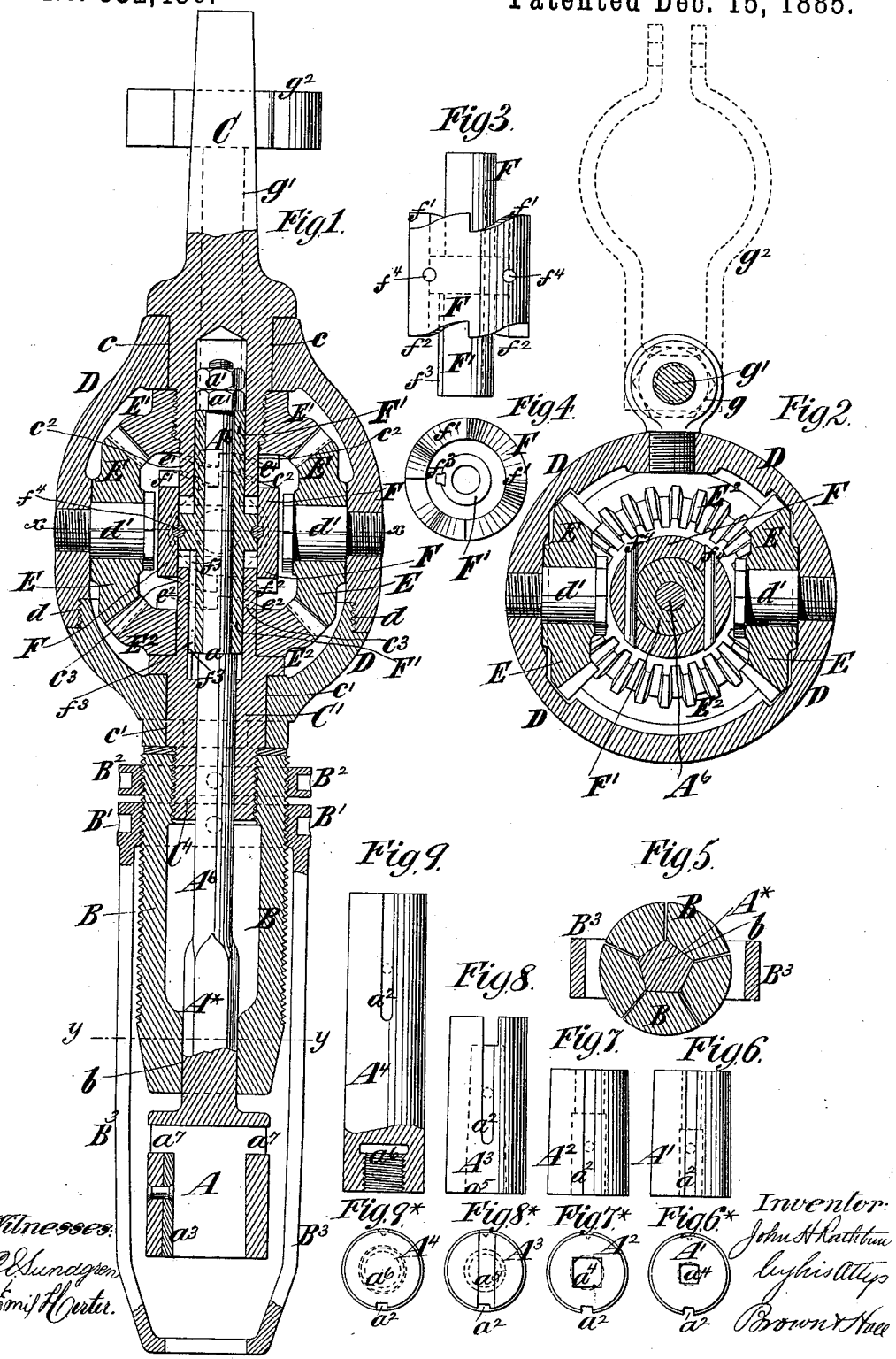

UNITED STATES PATENT OFFICE.

JOHN H. RATHBUN, OF NEW YORK, N. Y., ASSIGNOR OF ONE-HALF TO C. H. DE LAMATER & CO., OF SAME PLACE.

TAPPING DEVICE.

SPECIFICATION forming part of Letters Patent No. 332,436, dated December 15, 1885.

Application filed November 2, 1885. Serial No. 181,571. (No model.)

*To all whom it may concern:*

Be it known that I, JOHN H. RATHBUN, of the city and county of New York, in the State of New York, have invented a new and useful Improvement in Tapping Devices, of which the following is a specification.

In my United States Letters Patent No. 318,654, dated May 26, 1885, I have shown and described a tapping device for forming screw-threads in holes drilled in metal, and which comprises a split chuck, which is secured to a rotating spindle and has a polygonal socket formed by spring jaws or elastic fingers, and a polygonal shank through which the tap is to be turned, and which fits in and is driven by the chuck. The elastic force of the spring jaws or fingers of the chuck will effect the driving of the tap until such time as it has entered to the required distance, and the frictional resistance then offered to its further entry will cause the chuck to turn upon the polygonal shank of the tap-driver and avoid any breakage of parts. Such a device may also be employed with advantage in securing stud-bolts in screw-threaded holes in iron work, the stud being screwed at one end into a socket for its reception, which socket is connected with the polygonal shank, and the chuck will, by its engagement with the shank, turn the stud-bolt until it is entered to the proper distance and will then turn upon the polygonal shank.

In the use of devices of the kind above described, whether for tapping holes or for inserting stud-bolts, it is necessary to rotate the tap or stud driver first in one direction, in order to advance it into the hole, and then in the reverse direction, in order to back the tap out of the hole, in case the device be used for tapping, or unscrewing the stud-driver from the stud in case the device be employed for inserting stud-bolts.

The object of my present invention is to provide a simple and compact machine or apparatus which may be applied to the rotating spindle of a drill or a tapping or boring machine, and which will effectively operate the chuck and tap or stud holder with rotary motion alternately in opposite directions, as is necessary to secure the desired result.

The invention consists in novel combinations of parts which are hereinafter described, and pointed out in the claims.

In the accompanying drawings, Figure 1 represents a vertical section of an apparatus or machine embodying my invention. Fig. 2 is a horizontal section upon the plane of the dotted line $x\,x$, Fig. 1. Figs. 3 and 4 are respectively an elevation and a plan of a clutch-sleeve comprised in the apparatus and hereinafter described. Fig. 5 is a transverse section upon the plane of the dotted line $y\,y$, Fig. 1. Figs. 6, 7, 8, and 9 are elevations of attachments, which may be employed in the machine according to whether it is to be used for tapping, for drilling, or for inserting stud-bolts, and Figs. 6*, 7*, 8*, and 9* are plans or end views of the several attachments.

Similar letters of reference designate corresponding parts in all the figures.

A designates a socketed tool-holder having an upwardly-projecting stem or spindle, $A^6$, which is shouldered at $a$, and provided with nuts $a'$ at its upper end. This tool-holder might be constructed for the machine, if to be used only for tapping, with a square socket to receive the head of the tap, or for one to be used only for inserting stud-bolts with a screw-socket to receive a stud; but, in order to adapt the machine for general work, I provide attachments or tool-holders $A'$ $A^2$ $A^3$ $A^4$, which are represented in Figs. 6, 7, 8, and 9, and which may, any of them, be inserted within the socketed tool-holder A. The several tool-holders or attachments are all of substantially the same form externally, and are adapted to fit within the socketed holder A, and each of them has a longitudinal groove, $a^2$, which fits a rib or feather, $a^3$, in the socketed holder A, and serves to prevent the attachment or tool-holder from turning in the holder A. The tool-holders $A'$ $A^2$ may have square sockets $a^4$, for receiving the square heads of taps of different sizes. The tool-holder $A^3$ may have a round socket, $a^5$, for receiving drills, and the tool-holder $A^4$ may have a screw-threaded socket, $a^6$, for receiving stud-bolts. The parts of the machine which comprise my invention are not necessary for drilling, and I have shown the drill-socket or tool-holder $A^3$ only to illustrate that the machine may be used for the several purposes of drilling a hole, then tapping it, and finally screwing a stud-bolt therein.

The tool-holders A' A², &c., may be readily removed from the socketed holder A by inserting a drift or key through a transverse slot, $a^7$, therein.

The stem or spindle $A^6$ of the tool-holder A comprises at its lower portion a polygonal formation or portion, A*, here represented as five-sided, and which fits a socket, $b$, of corresponding shape in the chuck B, which is split lengthwise, as shown in the transverse section in Fig. 5, in order to form a series of elastic jaws or spring-fingers, which grasp the sides of the polygonal formation A* on the tool-holder A, as described in my Letters Patent above referred to.

C designates a spindle or shank, which is to be inserted into the socketed spindle of a drilling, tapping, or boring machine, and C' designates a supplemental spindle portion, which is separate from the spindle or shank C.

D designates a hollow casing or shell which has at the ends cylindric bearings fitting journal portions $c\ c'$ on the spindle portions C C'. This casing or shell is composed of two members united by a joint, $d$, and has inserted in it at diametrically-opposite points studs or journals $d'$, which are headed or flanged at their inner ends, and which serve as supports for idler gear-wheels E.

Upon the portion of the spindle or shank C which projects downward within the shell or casing D is screwed fast or otherwise secured to, rotate therewith a bevel-wheel, E', which gears into both the idler-wheels E, and fitted to turn upon the spindle portion C' is a bevel wheel or pinion, E², which also engages with the idler-wheels E. The split chuck B is screwed firmly or otherwise secured in fixed position on the spindle portion C', which projects beyond the shell or casing D, so that it will turn with such spindle portion. The gear-wheels E' E² have upon their under and upper sides, respectively, clutch formations $e'\ e^2$, and F designates a clutch-sleeve, or a sleeve having at opposite ends clutch formations $f'\ f^2$, adapted to engage with and operate on the clutch formations $e'\ e^2$ of the wheels E' E². The clutch-sleeve F has a sliding bearing upon cylindric bearings $c^2\ c^3$ of the spindle portions C C', and said clutch-sleeve is secured fast to an inner sleeve, F', which is fast on the stem or spindle $A^6$, between the shoulders $a$ and the nuts $a'$, and which has a groove and spline or feather connection, $f^3$, with the interior of the spindle portion C'. As here represented, the clutch-sleeve F is secured fast upon an annular projection on the inner sleeve, F', by means of cross-pins $f^4$, or it may be secured thereon in any other suitable manner. The exterior of the inner sleeve, F', fits truly-bored sockets in the spindle portions C C', and, as before stated, is locked to turn with the lower spindle portion, C', by means of a groove and feather, $f^3$.

From the above description it will be understood that if the shell or casing D be held against turning, the idler-wheels E, receiving motion from the wheel E', will impart a motion in the reverse direction to the wheel E². In order to hold the shell or casing D from thus turning, it may be provided at one side with a projecting eye, $g$, (shown in Fig. 2,) which is adapted to slide upon a vertical rod, $g'$, and this rod may be sustained in stationary position by a clamp, $g^2$, (shown in full lines in Fig. 1, and in dotted lines in Fig. 2,) and which may be secured to the spindle-bearing or other stationary portion of the drilling, tapping, or boring machine with which my apparatus is used. It will also be understood that through the inner sleeve, F', and its groove and feather connection, $f^3$, with the spindle portion, C', said spindle portion is locked so as to always turn in the same direction with the clutch-sleeve F, and hence the chuck B, which is secured fast to the spindle portion C', will always have imparted to it the same direction of rotation as the clutch-sleeve F. If the clutch-sleeve and gear-wheel E' be brought into such relative position that the clutch formation $e'$ on the wheel engages the clutch formation $f'$ of the clutch-sleeve, the spindle portion C, the wheel E', the clutch-sleeve F, the spindle portion C', and the chuck B will all be rotated in the same direction, suitable for advancing a tap or a stud-bolt into the work. If, on the contrary, the clutch-sleeve F and the wheel E² be brought into such relative position that the clutch formation $f^2$ on the sleeve engages the clutch formation $e^2$ on the wheel, then the clutch-sleeve F, the wheel E², the spindle portion C', and the chuck B, attached thereto, will be driven in the same direction, which, by reason of the idler-wheels E, will be a reverse direction to that of the wheel E' and spindle portion C, and suitable for backing out a tap or for removing a tool-holder from a stud-bolt after it has been screwed in place. As here represented, the split chuck B is externally screw-threaded, and has fitted upon it a collar or band, B', and a lock-nut, B². From the collar or band B' depends a stirrup or bail-like portion, B³, which projects beyond the tool-holder A, and through and beyond which a tap or stud will extend when the machine is in use. The purpose of this stirrup or bail-like portion is to form a guard for stopping the advancing movement of the tap or stud when it has been inserted to the required depth. The collar or band B' may be adjusted upward or downward on the screw-threaded chuck B, in order to give the tap or stud the required projection beyond the guard, and then may be locked in this position by the nut B². The change in the direction of the rotation of the spindle portion C' and the chuck B will be effected in the following manner: When the tap or stud which is to be advanced by the machine into the work comes against the work, it will produce an upward pressure through the stem or spindle $A^6$, and the clutch-sleeve F being carried by such stem or spindle portion it will be pushed upward toward the wheel E', so as to bring the clutch formations $e'$ $f'$ in engagement. When the guard $B^3$ comes against the work after the tap or stud has been advanced to the required depth, the upward pressure exerted through the guard will exert an upward force upon the whole machine, with the exception of the sleeve F and the stem or spindle $A^6$, and as the tap or stud is still farther advanced the sleeve F will descend out of engagement with the wheel E', and the wheel $E^2$ will be so raised as to cause the engagement of the clutch formations $e^2$ $f^2$, whereupon the chuck B will receive rotary motion in a reverse direction to that which it before had, as above described.

What I claim as my invention, and desire to secure by Letters Patent, is—

1. The combination, with a tool-holder and a shank or spindle projecting therefrom, of two spindle portions, C C', the former adapted to be inserted in a machine-spindle and the latter serving to transmit motion to the tool-holder, oppositely-arranged bevel-wheels, each having clutch formations, one being fast on the spindle portion C and the other fitted to the spindle portion C', a non-rotary casing or frame, and idler bevel-wheels journaled therein and engaging the two oppositely-arranged wheels, and a sliding clutch-sleeve on the shank or spindle of the tool-holder, adapted to make engagement with either of the clutch formations on the oppositely-arranged wheels, to transmit to the tool-holder rotary motion in one or other direction, substantially as herein described.

2. The combination, with a tool-holder having a shank or spindle, $A^6$, of the spindle portions C C', and oppositely-arranged wheels E' $E^2$, with their clutch formations, the non-rotary casing or frame, and wheels supported thereby and engaging the wheels E' $E^2$, and the sliding clutch-sleeve F, fitting the cylindric bearing portions $c^2$ $c^3$ of the spindle portions C C', and serving to transmit motion in one or other direction to the tool-holder, substantially as herein described.

3. The combination, with a tool-holder and its shank or spindle having a polygonal formation, $A^*$, of the spindle portions C C', the split polygonal chuck B on the spindle portion C', the wheels E' $E^2$, the former fast on the spindle portion C and the latter adapted to rotate on the spindle portion C', and both provided with clutch formations, a non-rotary casing or frame, and wheels supported thereby and engaging the wheels E' $E^2$, and a sliding clutch-sleeve locked to the spindle portion C' to turn therewith, and adapted to engage with the wheel E' or $E^2$, to turn the spindle portion C' with its chuck and tool-holder in one or other direction, substantially as herein described.

4. The combination, with a tool-holder having a shank or spindle, $A^6$, with a polygonal formation, $A^*$, of the spindle portions C C', the split polygonal chuck B on the spindle portion C', the wheels E' $E^2$, provided with clutch formations, a non-rotary casing or frame, and wheels supported thereby and engaging the wheels E' $E^2$, the sliding clutch-sleeve F, adapted to engage the clutch formation on either wheel E' or $E^2$ and fitting the bearing portions $c^2$ $c^3$ of the spindle portions C C', and the inner sleeve, F', on the shank or spindle $A^6$, made fast to the clutch-sleeve F, sliding within the spindle portions C C', and locked by a groove and feather to the spindle portion C', to drive it and its chuck B in one or other direction, substantially as herein described.

JOHN H. RATHBUN.

Witnesses:
 THOS. J. RIDER,
 A. DE BONNEVILLE.